United States Patent [19]

Koga et al.

[11] Patent Number: 4,862,769
[45] Date of Patent: Sep. 5, 1989

[54] MULTIPLE DISC CLUTCH APPARATUS

[75] Inventors: Hidetaka Koga; Ikuo Kurosawa; Atsushi Yamazaki; Kouji Takahashi; Fumihiro Naoe; Motoi Takemura; Naoyuki Kurotaki, all of Fujisawa, Japan

[73] Assignee: Isuzu Motors Limited, Tokyo, Japan

[21] Appl. No.: 149,182

[22] Filed: Jan. 27, 1988

[30] Foreign Application Priority Data

Jan. 30, 1987 [JP] Japan .................. 62-18458

[51] Int. Cl.$^4$ .................. B60K 17/35; B60K 17/02
[52] U.S. Cl. ...................... 74/710.5; 74/711; 180/248; 180/249
[58] Field of Search ............ 192/85 AA, 85 A, 85 C, 192/85 AC, 84 R; 180/248, 249, 250; 60/545; 74/710.5, 711

[56] References Cited

U.S. PATENT DOCUMENTS

| 799,064 | 9/1905 | Kowsky | 60/545 |
|---|---|---|---|
| 3,546,969 | 12/1970 | Gibson et al. | 74/711 |
| 3,845,671 | 11/1974 | Sharp et al. | 74/711 X |
| 4,186,829 | 2/1980 | Schneider et al. | 192/85 AA |
| 4,601,359 | 7/1986 | Weismann et al. | 180/248 X |
| 4,763,749 | 8/1988 | Miura et al. | 74/710.5 X |

FOREIGN PATENT DOCUMENTS

| 208743 | 9/1959 | Austria | 60/545 |
|---|---|---|---|
| 191631 | 11/1983 | Japan . | |
| 63-17122 | 1/1988 | Japan . | |
| 2192160 | 1/1988 | United Kingdom | 180/249 |

Primary Examiner—Leslie A. Braun
Assistant Examiner—William Gehris
Attorney, Agent, or Firm—Browdy and Neimark

[57] ABSTRACT

In a driving apparatus for a four-wheel drive vehicle in accordance with the present invention, a multiple disc clutch is incorporated between a front wheel driving system and a rear wheel driving system, a hydraulic chamber is formed in a fixed casing supporting rotatably a front differential case in the front wheel driving system and a clutch piston is disposed in the hydraulic chamber. Bearings are disposed between the clutch piston and the front differential case in order to enable them to rotate relatively. Hydraulic pressure generated from hydraulic pressure generation means disposed outside each driving system is caused to act on the clutch piston so that the multiple disc clutch is operated by the press force of the clutch piston through the front differential case and the differential operation of the front and rear wheel is restricted in accordance with the operation force of the multiple disc clutch. Accordingly, the size in the radial direction can be reduced in the axial direction of the apparatus itself, and even if there is any limitation to the space, a large hydraulic pressure is permitted to act on the muliple disc clutch by forming only the small hydraulic chamber described above.

7 Claims, 2 Drawing Sheets

MULTIPLE DISC CLUTCH APPARATUS

BACKGROUND OF THE INVENTION

1. Field of the Invention

This invention relates to a multiple disc clutch apparatus used for a driving system, such as a transmission and a center differential locking device for vehicles.

2. Description of the Prior Art

In general, in a multiple disc clutch, a plurality of input side clutch plates fixed to an input side rotary body so that these clutch plates cannot be turned relatively to the input side rotary body but can be moved slidingly in the axial direction at either the outer circumferential edges thereof or the inner circumferential edges thereof, and a plurality of output side clutch plates fixed to an output side rotary body so that these clutch plates cannot be turned relatively to the output side rotary body but can be moved slidingly in the axial direction at the circumferential edges thereof which are on the opposite side of those of the input side clutch plates at which the input side clutch plates are fixed to the input side rotary body are laminated alternately in the axial direction, the resultant laminated body of the input and output side clutch plates being pressed by a clutch piston, which is provided at one side of the laminated body with respect to the direction of the axis of rotation thereof, toward the other side thereof so that the laminated clutch plates are pressed against one another to generate a frictional force on the frictional surfaces thereof, whereby the input side rotary body and output side rotary body are put in a frictionally connected state, i.e. a power transmitted state.

The conventional transmissions for vehicles, such as automobiles include a transmission disclosed in, for example, Japanese Patent Laid-open No. 191631/1983, in which a valve body in the interior of the transmission is provided therein with various types of valves, such as a pressure regulator valve adapted to regulate hydraulic pressure from an oil pump, or a manual valve adapted to switch the hydraulic pressure, which is regulated by the pressure regulator valve, in accordance with the vehicle steering condition, and oil passages. The hydraulic pressure referred to above operates the clutch piston in the multiple disc clutch to enable the rotational force from the engine on the input side to be transmitted to a desired gear on the output side.

Japanese Patent Application No. 159836/1986 discloses an embodiment in which an electromagnetic multiple disc clutch unit shown in FIG. 3 is used, of a center differential locking device for four-wheel drive vehicles. In this electromagnetic multiple disc clutch unit 70, a solenoid means 71 and a multiple disc clutch 72 are unitarily formed. In this center differential locking device for four-wheel drive vehicles, the electromagnetic multiple disc clutch unit 70 is used as a center differential locking means, and the attractive force of the solenoid means 71 in the electromagnetic multiple disc clutch unit 70 can be varied very easily by merely controlling the amperage of the solenoid 73.

In general, the torque capacity of a multiple disc clutch is determined depending upon the diameter and number of the clutch plates, and the level of the attractive force of the solenoid. Therefore, if the outer diameter of the electromagnetic multiple disc clutch is limited, the diameter of the clutch plates as well as that of the solenoid in the solenoid means are limited. Consequently, the attractive force of the solenoid, which is determined by the cross-sectional area of an iron core, cannot be set to higher than a certain level.

SUMMARY OF THE INVENTION

A primary object of the present invention is to provide a multiple disc clutch apparatus capable of solving the above-mentioned problems, adapted to supply a hydraulic pressure, which is converted by an electromagnetic force of a solenoid means provided on the outer side of a driving system, to a clutch piston in a multiple disc clutch provided in the driving system, capable of eliminating a hydraulic pump and a hydraulic pressure regulator valve, constructed to large dimensions as compared with a conventional apparatus of this kind in which a solenoid means and a multiple disc clutch are unitarily formed, by providing the multiple disc clutch alone in a place in a vehicle in which the dimensions of the space therein is limited, in other words, a place in which the outer diameter and axial length of the driving system are limited due to the necessity of preventing the driving system from interfering with other parts, and the solenoid means, which constitutes a hydraulic pressure generating source, in some other place, to thereby enable the multiple disc clutch to be formed to a high, i.e., sufficient torque capacity, and capable of simply controlling the clutch pressing force by regulating the flow rate of an electric current to the solenoid.

Another object of the present invention is to a multiple disc clutch apparatus consisting of a multiple disc clutch composed of a plurality of clutch plates slidably spline-fitted in an input side rotary member provided in a driving system, a plurality of clutch plates slidably spline-fitted in an output side rotary member, and a clutch piston adapted to press these clutch plates to one another to restrict rotation difference between these two rotary members; a solenoid means which is composed of a solenoid, an iron core adapted to be attracted and displaced to the solenoid by the electromagnetic force thereof, and a piston connected to the iron core and adapted to be moved slidingly in a cylinder, and which is provided on the outer side of the driving system; and an oil passage communicating a hydraulic chamber, which contains an oil working on the clutch piston in the multiple disc clutch, with a hydraulic chamber containing an oil on which the piston in the solenoid means works, whereby a hydraulic pressure converted by the electromagnetic force of the solenoid is supplied to the clutch piston in the multiple disc clutch.

Still another object of the present invention is to provide a multiple disc clutch apparatus characterized in that the clutch plates slidably spline-fitted in the input side rotary member and the clutch plates slidably spline-fitted in the output side rotary member are arranged in an alternately laminated state.

A further object of the present invention is to provide a multiple disc clutch apparatus characterized in that the iron core attracted and displaced to the solenoid by the electromagnetic force thereof and the piston slidingly moved in the cylinder are connected together by a rod.

A further object of the present invention is to provide a multiple disc clutch apparatus characterized in that a multiple disc clutch is installed in the driving system in a driving unit for a four-wheel drive vehicle provided with a center differential which is adapted to distribute a driving force to the front and rear wheels, to thereby enable the multiple disc clutch to restrict the differential movements of the front and rear wheels.

A further object of the present invention is to provide a multiple disc clutch apparatus characterized in that a center differential, a multiple disc clutch, and a differential for front and rear wheels are arranged linearly in the axial direction in the mentioned order, whereby the radial size of the clutch apparatus is reduced to enable the apparatus to be made compact.

A further object of the present invention is to provide a multiple disc clutch apparatus characterized in that the output side rotary member constituting an inner case for the clutch plates and a differential case are formed unitarily in a driving force-transmitted state, the center differential consisting of planetary gears, the input side rotary member constituting an outer case for the clutch plates and a carrier for the planetary gears being connected together in a driving force-transmitted state, whereby the restricting of the differential movements of the front and rear wheels can be done by the multiple disc clutch.

A further object of the present invention is to provide a multiple disc clutch apparatus characterized in that the clutch piston for pressing the clutch plates is set on the inner surface of a casing which constitutes a transfer case for the driving system in the driving unit for a four-wheel drive vehicle, the pressing force of the clutch piston being applied to the clutch plates via a differential case provided in the transfer case, in such a manner that the clutch plates are pressed against one another, whereby the pressing force can be transmitted reliably from the clutch piston to the clutch plates.

A further object of the present invention is to provide a multiple disc clutch apparatus characterized in that the clutch piston which is adapted to press the clutch plates presses a differential case via a thrust bearing, so that the pressing force of the clutch piston is smoothly transmitted.

The above and other objects as well as advantageous features of the invention will become apparent from the following description of the preferred embodiments taken in conjunction with the accompanying drawings.

DESCRIPTION OF THE PREFERRED EMBODIMENTS

An embodiment of the multiple disc clutch apparatus according to the present invention will now be described with reference to the drawings.

Figure 1:
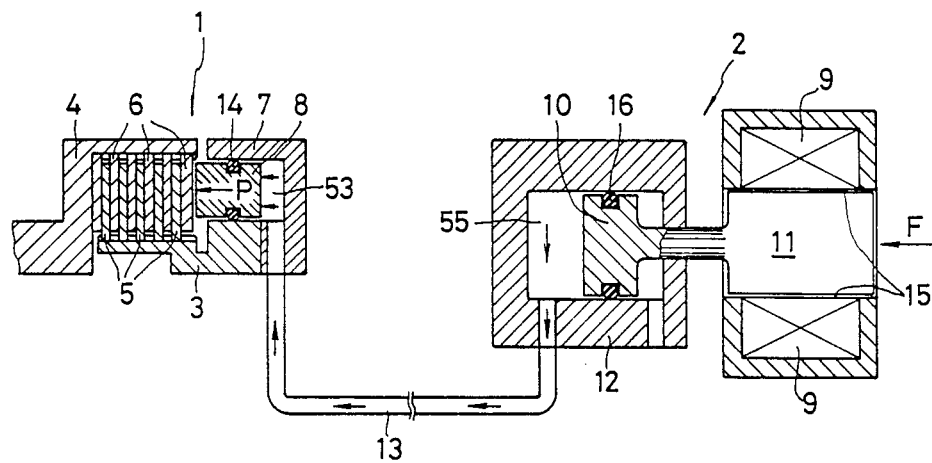
FIG. 1 illustrates a principal portion of an embodiment of a multiple disc clutch apparatus according to the present invention.
Figure 3:
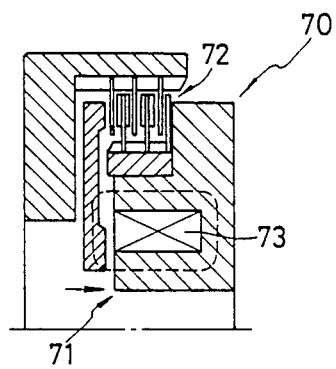
FIG. 3 is a schematic diagram of an example of a conventional electromagnetic multiple disc clutch applied to a center differential locking device for a four-wheel drive vehicle.

FIG. 1 is a schematic diagram showing the basic concept of the multiple disc clutch apparatus according to the present invention. This multiple disc clutch apparatus is a wet type multiple disc clutch apparatus, which consists of a multiple disc clutch 1 used for the transmission of power and provided in a driving system, and a solenoid means 2 provided on the outer side of the driving system. The multiple disc clutch 1 has an input side rotary member 3 formed integrally with a driving shaft (not shown), and an output side rotary member 4 adapted to output a driving force. A plurality of clutch plates 5 are slidably spline-fitted in the input side rotary member 3, and a plurality of clutch plates 6 are sliding spline-fitted in the output side rotary member 4. The input side clutch plates 5 and output side clutch plates 6 are provided in an annular space formed between the two rotary members 3, 4, in such a manner that these clutch plates 5, 6 are laminated alternately in the direction of the axis of rotation of the rotary members 3, 4. A clutch cylinder 7 is formed at one end of the input side rotary member 3, and a clutch piston 8 is provided in this clutch cylinder 7 so that the clutch piston 8 can be moved slidingly in the direction of the axis of rotation of the rotary members 3, 4. A hydraulic chamber 53 containing oil which works on the clutch piston 8 is formed by the clutch cylinder 7 and clutch piston 8, and a seal 14 for preventing the leakage of the pressure oil is provided suitably between the clutch piston 8 and clutch cylinder 7. The solenoid means 2 has an annular solenoid 9. An iron core 11 connected to a solenoid piston 10 is provided in a central bore 15 in this solenoid 9. The solenoid piston 10 is provided slidably in a solenoid cylinder 12. The solenoid cylinder 12 and solenoid piston 10 define a hydraulic chamber 55 in which an oil working on the solenoid piston 10 is stored. A suitable seal 16 for preventing the leakage of the pressure oil is also provided between the solenoid piston 10 and solenoid cylinder 12. The clutch cylinder 7 and solenoid cylinder 12 are connected together by an oil passage 13.

The operation of the multiple disc clutch apparatus embodying the present invention will now be described. In order to turn on the multiple disc clutch for operating a transmission manually, an electric current is supplied to the solenoid 9 by an operation of the driver. When the solenoid 9 is excited, a force F is applied to the iron core 11, so that the solenoid piston 10 connected to the iron core 11 is displaced in the direction of the force F to cause hydraulic pressure to occur in the hydraulic chamber 55 in the solenoid cylinder 12. The hydraulic pressure thus generated is transmitted to the hydraulic chamber 53 in the clutch cylinder 7 via the oil passage 13 to cause a pressing force P to occur in the clutch piston 8 and press the clutch plates 5, 6 against one another. Consequently, the input side rotary member 3 and output side rotary member 4 are connected in a driving force-transmitted state. In other words, the relative rotational difference between the input side rotary member 3 and output side rotary member 4 is reduced to a low level or zero, the differential operations of the rotary members 3, 4 being thus restricted.

When the solenoid 9 is deexcited, the attractive force F is lost in the iron core 11. In certain cases, the iron core 11 is returned forcibly by the force of a spring. Simultaneously with the returning of the iron core 11, the solenoid piston 10 returns. As a result, the hydraulic pressures in the hydraulic chamber 55 in the solenoid cylinder 12 and hydraulic chamber 53 in the clutch cylinder 7 are lost, or, due to seal-back effect of the cylinder, the clutch piston 8 moves back and the multiple disc clutch 1 is turned off. The pressing force P of the clutch piston 8 is substantially proportional to the level of an electric current supplied to the solenoid 9. Accordingly, the torque of the multiple disc clutch 1 can, of course, be varied substantially in proportion to the level of the electric current supplied to the solenoid 9 by controlling this level suitably. Therefore, the torque capacity of this multiple disc clutch apparatus can be utilized by varying the same in accordance with a driving system to which the clutch apparatus is applied. Since the solenoid means, a hydraulic pressure generating source, can be provided in a space other than the space in which the multiple disc clutch is provided, it is possible to furnish the multiple disc clutch, which is provided in a place having a limited space, with a high torque capacity, i.e. a high torque transmitting force, and control the clutch pressing force simply by regulating the flow rate of an electric current supplied to the solenoid.

Figure 2:
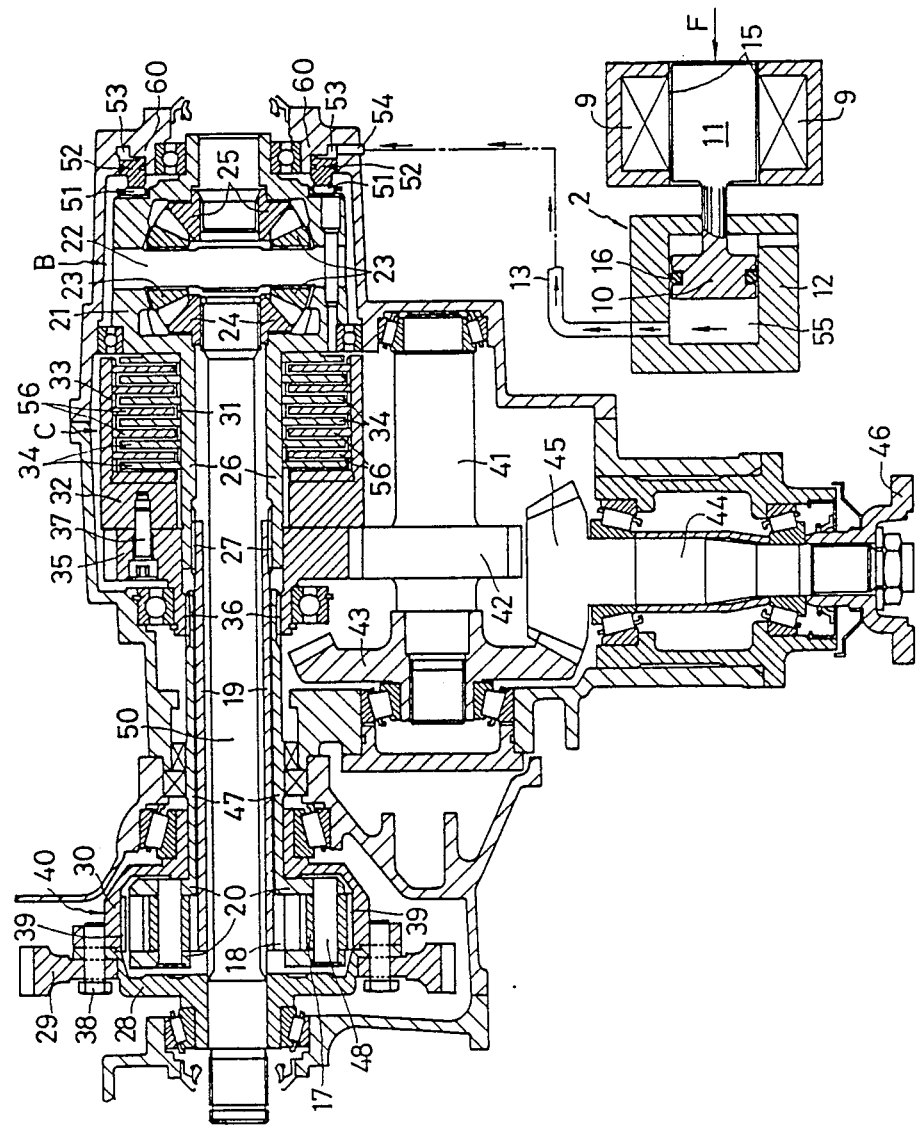
FIG. 2 is a sectional view of another embodiment in which the multiple disc clutch apparatus according to the present invention is applied to a driving unit for a four-wheel drive vehicle.

The case where the multiple disc clutch apparatus according to the present invention is used as a multiple disc clutch apparatus for restricting a differential operation of a center differential consisting of planetary gears in a four-wheel drive vehicle will now be described with reference to FIG. 2. This multiple disc clutch apparatus is installed in the driving system of a four-wheel drive vehicle so as to restrict the differential movements of the front and rear wheels.

The left and right cases 28, 30 are fixed by bolts 38 to a driving gear 29 which is meshed with an output gear in a transmission, and these parts are unitarily turned. A ring gear 39 is cut in the inner circumferential surface of the right case 30, and planetary gears, i.e. pinions 17 mounted on support shafts 48 are meshed with the ring gear 39, a sun gear 18 being meshed with the pinions 17. This arrangement constitutes a center differential consisting of planetary gears 40. The sun gear 18 in the planetary gears 40 has a sun gear shaft 19 extending axially along a front wheel driving shaft 50, and a carrier 20 supporting the support shafts 48, a carrier shaft 47 extending axially. As shown in the drawing, the front wheel driving shaft 50, sun gear shaft 19 and carrier shaft 47 are arranged concentrically in the mentioned order to that they can be turned relatively to one another. A front differential B is positioned on the right side of the front wheel driving shaft 50 in the drawing. The front differential B is a known type differential gear consisting of a front differential case 21, a pinion shaft 22 supported on the front differential case 21, pinions 23 supported pivotably on the pinion shaft 22, and left and right side gears 24, 25 meshed with the pinions 23. The left and right front wheel driving shafts 50 are spline-fitted in the inner circumferential surfaces of the left and right side gears 24, 25. A projecting shaft portion extending along the front wheel driving shaft 50 is formed integrally with and at the side of the front differential case 21 which faces the planetary gears 40. This projecting shaft portion, i.e. a front differential case shaft 26 forms the inner case for the wet type multiple disc clutch C. A spline is cut in the inner circumferential surface of a front portion of the front differential case shaft 26, and a spline-engaged portion 27 is formed by this spline and a spline cut in the same manner in a front portion of the sun gear shaft 19. A spline 31 is also cut in the outer circumferential surface of the front differential case shaft 26, with which an outer case 32 for the multiple disc clutch C is engaged. A spline 33 is cut in the inner circumferential surface of the outer case 32 for the multiple disc clutch C. The clutch plates consisting of a plurality of inner and outer plates 34, 56 are slidably fitted in the splines 31, 33 so that the inner and outer discs are meshed alternately. A cylindrical helical gear 35 is held unitarily by bolts 37 on the side of the outer case 32 for the multiple disc clutch C which faces the planetary gears 40, and a spline is cut in the inner circumferential surface of a front portion of this helical gear 35. A spline is also cut in the outer circumferential surface of the end portion of the carrier shaft 47 which is opposed to the spline in the helical gear 35, and these splines form a spline-engaged portion 36. Owing to this arrangement, the multiple disc clutch C can restrict the differential operation of the center differential consisting of the planetary gears 40. A large bevel gear shaft 41 is provided in parallel with the front wheel driving shaft 50 so that the shaft 41 can be turned. The large bevel gear shaft 41 is provided with a driving gear 42 on the portion thereof which is opposed to the helical gear 35, as well as a large bevel gear 43 fitted fixedly in the front portion thereof. A rear wheel driving shaft 44 is supported so that it is positioned so as to extend at right angles to the large bevel gear shaft 41, and a small bevel gear, i.e. a pinion 45 is mounted on the free end portion of the rear wheel driving shaft 44 so that the pinion 45 is meshed with and transmits power to the large bevel gear 43. A sleeve yoke or flange 46 is mounted on the outer end portion of the rear wheel driving shaft 44 by a known means. A clutch piston 52 is provided via a thrust bearing 51 on the portion of the front differential case 21 which is on the opposite side of the multiple disc clutch C, and a hydraulic chamber 53 in the clutch piston 52 forms a part of a transfer case or fixed casing 60 for a driving unit. In this arrangement, an oil pressure occurring in the solenoid means 2 is supplied from a feed port 54 through an oil passage 13 into the hydraulic chamber 53, so that the multiple disc clutch C is put in a power-transmitted state.

The operation of the driving unit used in the present invention for a four-wheel drive vehicle will now be described. The driving force from the transmission is transmitted from the driving gear 29 to the planetary gears 40 which constitute a center differential. The driving force inputted into the planetary gears 40 is transmitted to the ring gear 39 formed on the inner circumferential surface of the right case 30, and this driving force is then distributed in two ways and further transmitted. First, one component of the driving force inputted into the ring gear 39 is transmitted from the carrier 20, which supports the pinions 17, planetary gears, to the cylindrical gear, the helical gear 35 to be exact, via the carrier shaft 47 and spline-engaged portion 36, and then to the rear wheel driving shaft 44 via the driving gear 42, large bevel gear 43 and pinion 45. The other component of the driving force inputted into the ring gear 39 is transmitted from the pinions 17 to the sun gear 18 and sun gear shaft 19, and then to the front differential case 21 for the front differential B via the spline-engaged portion 27 and the inner case, i.e. the front differential case shaft 26. The resultant driving force is then transmitted to the left and right front wheel driving shafts 50 via the front differential B.

In a normal driving force-transmitted state, the inner and outer plates 34, 56, which constitute the clutch plates in the multiple disc clutch C, are turned relative to one another. When a difference in rotations of the front wheel driving shaft and rear wheel driving shaft, i.e. the inner case for the multiple disc clutch C, which constitutes the front differential case shaft 26, and the outer case 32 for the multiple disc clutch C, which is fixed to the rear helical gear 35 has become extremely large, the solenoid means 2 is operated to move the solenoid piston 10 and generate hydraulic pressure for the purpose of restricting the differential movement between these driving shafts. This hydraulic pressure is transmitted to the clutch piston 52 provided in the casing 60, by sending oil from the hydraulic chamber 55 to the hydraulic chamber 53 through the oil passage 13. Consequently, the clutch piston 52 moves to left in the drawing, and the pressing force thereof is transmitted to the front differential case 21 via the thrust bearing 51. Since the front differential case 21 is spline-fitted in the sun gear shaft 19 as designated by a reference numeral 27, it can be moved slightly in the axial direction. Accordingly, the pressing force of the clutch piston 52 is transmitted from the front differential case 21 to the multiple disc clutch C, so that the multiple disc clutch C is put in a power-transmitted state. The difference between the movements of the front wheel driving shaft and rear wheel driving shaft can thereby be restricted, and, in some cases, the two driving shafts can be put in a unitary state, i.e. a differential-locked state by setting the difference between the rotations of these driving shafts to zero.

The present invention is not, of course, limited to the above embodiments; it may be modified in various ways within the scope of the appended claims.

What is claimed is:

1. A driving apparatus for a four-wheel drive vehicle comprising:
   a driving gear meshing with an output gear of a transmission;
   a center differential disposed on the same axial line as said driving gear, for distributing power transmitted to said driving gear through said output gear to a driving system on the front wheel side and to a driving system on the rear wheel side;
   a front differential disposed on the same axial line as said center differential and connected to said center differential to transmit power to said driving system on the front wheel side, said front differential having a front differential case connected operatively to said center differential;
   a fixed casing for supporting rotatably said front differential case;
   a first hydraulic chamber formed in said fixed casing;
   a clutch piston disposed in said first hydraulic chamber and capable of pressing said front differential case by the action of the oil pressure generated in said first hydraulic chamber;
   a gear of said driving system on the rear wheel side, disposed on the same axial line as said center differential and connected operatively to said center differential;
   a multiple disc clutch disposed on the same axial line as said center differential and between said driving system on the front wheel side and said differential movements of the front and rear wheels, and brought into an operative state by the press operation of said front differential case;
   bearings disposed between said clutch piston and said front differential case and permitting them to rotate relatively; and
   hydraulic pressure generation means for letting a hydraulic pressure act on said clutch piston disposed in said first hydraulic chamber.

2. A driving apparatus for a four-wheel drive vehicle according to claim 1, wherein said bearings disposed between said clutch piston and said front differential case are thrust bearings.

3. A driving apparatus for a four-wheel drive vehicle according to claim 1, wherein said center differential consists of a planetary gear device.

4. A driving apparatus for a four-wheel drive vehicle according to claim 1, wherein said multiple disc clutch includes an inner case formed by spline-fitted a large number of first clutch plates and an outer case formed by spline-fitting a large number of second clutch plates disposed laterally with said first clutch plates, said outer case is fixed to said gear of said driving system on the rear wheel side connected operatively to said center differential and said inner case is formed unitarily with said front differential case of said driving system on the front wheel side connected operatively to said center differential.

5. A driving apparatus for a four-wheel drive vehicle according to claim 1, wherein said center differential, said gear of said driving system on the rear wheel side, said multiple disc plate and said front differential are disposed on the same axial line and disposed sequentially in the axial direction.

6. A driving apparatus for a four-wheel drive vehicle according to claim 1, wherein said multiple disc clutch and said front differential are disposed on the same axial line and adjacent to each other in the axial direction.

7. A driving apparatus for a four-wheel drive vehicle according to claim 1, wherein said hydraulic pressure generation means consists of an oil passage communicating with said first hydraulic chamber and extending outside each of said driving systems, a second hydraulic chamber communicating with said oil passage and disposed outside each of said driving systems and a solenoid disposed outside each of said driving systems, for generating a hydraulic pressure in said second hydraulic chamber, and the hydraulic pressure converted to electro-magnetic force of said solenoid is generated in said second hydraulic chamber and the hydraulic pressure generated in said second hydraulic chamber is transmitted as the hydraulic pressure of said first hydraulic chamber through said oil passage.

* * * * *